United States Patent
Brown et al.

(10) Patent No.: US 8,171,067 B2
(45) Date of Patent: May 1, 2012

(54) IMPLEMENTING AN EPHEMERAL FILE SYSTEM BACKED BY A NFS SERVER

(75) Inventors: William B. Brown, Austin, TX (US); Duen-wen Hsiao, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 318 days.

(21) Appl. No.: 12/482,863

(22) Filed: Jun. 11, 2009

(65) Prior Publication Data
US 2010/0318564 A1 Dec. 16, 2010

(51) Int. Cl.
*G06F 12/00* (2006.01)
(52) U.S. Cl. ... 707/831; 707/821; 707/899; 707/E17.01; 709/200; 709/203; 709/227; 709/246; 711/100
(58) Field of Classification Search .................. None
See application file for complete search history.

(56) References Cited

U.S. PATENT DOCUMENTS

| | | | |
|---|---|---|---|
| 5,740,370 A * | 4/1998 | Battersby et al. ............. 709/219 |
| 5,832,510 A * | 11/1998 | Ito et al. ........................ 711/100 |
| 5,944,789 A * | 8/1999 | Tzelnic et al. ................. 709/214 |
| 5,987,476 A * | 11/1999 | Imai et al. .............................. 1/1 |
| 6,122,631 A | 9/2000 | Berbec et al. |
| 6,324,581 B1 * | 11/2001 | Xu et al. ........................ 709/229 |
| 6,405,315 B1 * | 6/2002 | Burns et al. ................... 713/190 |
| 6,675,229 B1 | 1/2004 | Bruno et al. |
| 6,721,824 B1 * | 4/2004 | Stewart ............................ 710/52 |
| 6,745,224 B1 * | 6/2004 | D'Souza et al. .............. 709/202 |
| 6,973,455 B1 * | 12/2005 | Vahalia et al. ......................... 1/1 |
| 7,430,570 B1 * | 9/2008 | Srinivasan et al. .................... 1/1 |
| 7,437,407 B2 * | 10/2008 | Vahalia et al. ................ 709/203 |
| 7,447,011 B2 * | 11/2008 | Wade et al. ............... 361/679.33 |
| 7,464,116 B2 * | 12/2008 | Sarma et al. ........................... 1/1 |
| 7,685,128 B2 * | 3/2010 | Anderson et al. ............ 707/770 |
| 7,702,745 B2 * | 4/2010 | Lin et al. ....................... 709/217 |
| 7,711,788 B2 * | 5/2010 | Lev Ran et al. ............... 709/213 |
| 7,865,468 B2 * | 1/2011 | Naineni ........................ 707/636 |
| 2002/0083748 A1 * | 7/2002 | Julien ............................... 71/11 |
| 2004/0064570 A1 * | 4/2004 | Tock ............................. 709/228 |
| 2008/0288609 A1 * | 11/2008 | Pramberger .................. 709/217 |

OTHER PUBLICATIONS

Howard et al, "Scale and Performance in a Distributed File System", Carnegie Mellon University, ACM, pp. 51-81, 1988.*
Morris et al, "Andrew: A Distributed Personal Computing Environment", ACM, pp. 184-201, 1986.*
Muthitacharoen et al, "A Low-bandwidth Network File System", MIT Laboratory for Computer Science, 2001.*

(Continued)

*Primary Examiner* — Hung Le
(74) *Attorney, Agent, or Firm* — John D. Flynn; Gregory K Goshorn; Greg Goshorn, P.C.

(57) ABSTRACT

Provided is a method for implementing a file system that includes a combination of read-only and read/write parts. A file system located on a data server maintains an original copy of a data store. An "Ephemeral" file system (EFS) is created on a client computer. The data server is contacted only once for each file accessed and the copy is in an original state each time the system is mounted. Changes made to the file system by one client are not seen by other clients. The EFS maintains the file system state in memory and uses the NFS server as a backing stored for cached file data. File data for files created on the client are backed up by the client system's swapping space.

20 Claims, 6 Drawing Sheets

OTHER PUBLICATIONS

Kistler et al, "Disconnected Operation in the Coda File System", Carnegie Mellon University, ACM, pp. 3-25, 1992.*

Michalakis et al., "Designing an NFS-based Mobile Distributed File System for Ephemeral Sharing in Proximity Networks," 2004 4th Workshop on Applications and Services in Wireless Networks (ASWN), IEEE, Piscataway, NJ. USA, pp. 225-231, 2004.

Borders et al., "Securing Sensitive COntent in a View-Only File System," University of Michigan, Department of Electricia Engineering and Computer Science, pp. 27-36, 2006.

Ports et al., "PersiFD: A Versioned File System with an Efficient Representation," MIT Computer Science Artificial Intelligence Laboratory, pp. 1-2, 2005.

* cited by examiner

IMPLEMENTING AN EPHEMERAL FILE SYSTEM BACKED BY A NFS SERVER

FIELD OF THE DISCLOSURE

This Invention was made with United States Government Support under Agreement No. HR0011-07-9-002 awarded by DARPA. The Government has certain rights in this invention. The claimed subject matter relates generally to computer memory management and, more specifically, to an efficient method for implementing a file system that includes a combination of read-only and read/write sections.

SUMMARY

Over the years, as computers have become exponentially faster and computer memory has grown exponentially larger, society has become increasingly dependent upon both the data stored in computer memory and the ability of computer to manipulate that data. Data is often stored on special computers, or data servers, that are specifically configured to provide high-speed access to the data for users, or clients, across networks such as a local area network (LAN) or the Internet. It is common for some stored data to be protected from modification by clients, i.e. "read-only." A particular data store may be completely read-only or partially read-only and partially "read/write," i.e. able to be modified by clients.

In a typical server file storage and delivery system that includes read-only components, such as a Network File System (NES), which is employed as an example throughout the Specification, a client that accesses the NFS server is provided with a replicated file system. A second method for providing access to such a file system is to provide symbolic links corresponding to portions of the file system to which the client needs write access. In this manner, a request to write to a read-only area of the file system is redirected to a separate read/write file system. Both methods provide a user with the ability to execute write operations while preventing modifications to the data stored by the NFS server.

Provided is a method for implementing a file system that includes a combination of read-only and read/write components. As the Inventors have realized, current approaches to the access of a data store that includes read-only portions are inefficient. In one current method, an entire data store in which a small portion is required to be writable is replicated, resulting in unnecessary client memory usage. Another method employs data pointers that are used to redirect memory requests to a separate read/write file system. This method creates an additional level of access that slows both read and write operations, i.e. rather than merely accessing memory, first a pointer must be processed and then the memory referenced by the pointer accessed, resulting in excessive computer execution cycles.

In the disclosed technology, a file system, such as one that employs an NFS server, maintains a single copy of a data store. The data server is contacted only once for each file accessed, the original system is in an original state each time the system is mounted and changes made to the file system by one client are not seen by other clients. The claimed methods may be implemented by the creation of an "Ephemeral" file system (EFS). Clients use the EFS rather then the normal NFS client file system to access the data. The EFS maintains the file system state in memory and uses the NFS server as a backing stored for cached file data. File data for files created on the client are backed up by the client system's swapping space. Implementation of the disclosed technology results in little pinned memory use by the file system and less total memory used by the typical data client.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

DETAILED DESCRIPTION OF THE FIGURES

Figure 1:
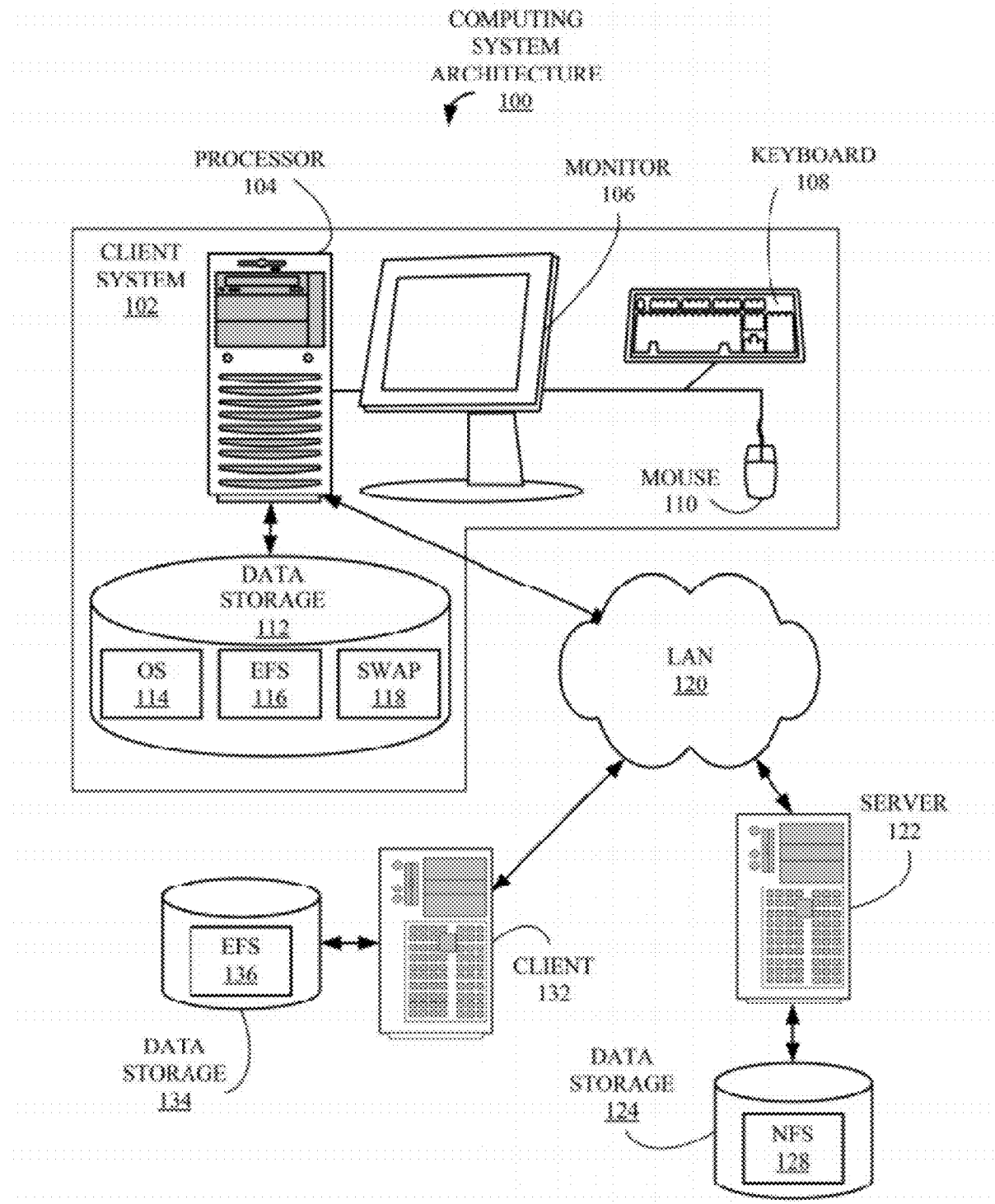
FIG. 1 is an example of one computing system architecture that may implement the claimed subject matter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One embodiment, in accordance with the claimed subject, is directed to a programmed method for memory management. The term "programmed method", as used herein, is defined to mean one or more process steps that are presently performed; or, alternatively, one or more process steps that are enabled to be performed at a future point in time. The term 'programmed method" anticipates three alternative forms. First, a programmed method comprises presently performed process steps. Second, a programmed method comprises a computer-readable medium embodying computer instructions, which when executed by a computer performs one or more process steps. Finally, a programmed method comprises a computer system that has been programmed by software, hardware, firmware, or any combination thereof, to perform one or more process steps. It is to be understood that the term "programmed method" is not to be construed as simultaneously having more than one alternative form, but rather is to be construed in the truest sense of an alternative form wherein, at any given point in time, only one of the plurality of alternative forms is present.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Turning now to the figures, FIG. 1 is a block diagram of one example of a computing system architecture 100 that may incorporate the claimed subject matter. A client system 102 includes a processor 104, coupled to a monitor 106, a keyboard 108 and a mouse 110, which together facilitate human interaction with computing system 100 and client system 102. Also included in client system 102 and attached to processor 104 is a data storage component 112, which may either be incorporated into processor 104, i.e. an internal device, or attached externally to processor 104 by means of various, commonly available connection devices such as but not limited to, a universal serial bus (USB) port (not shown).

Data storage 112 is illustrated storing an operating system (OS) 114 that controls the operation of computing system 102, an Ephemeral File System (EFS) 116 and a swap space 118. In this example, EFS 116 is configured to work in conjunction with OS 114 to implement the claimed subject matter and is described in more detail below in conjunction with FIGS. 3-6. In addition to serving a novel function in conjunction with the claimed subject matter, swap space 118 is employed as temporary storage when the memory requirements of processor 104 exceed the capacity of system memory 150 (see FIG. 2). Swap space 118 is also referred to in the Specification as the system's "paging space."

Client system 102 and processor 104 are connected a local area network (LAN) 120, which is also connected to a server computer 122. Although in this example, processor 104 and server 122 are communicatively coupled via LAN 120, they could also be coupled through any number of communication mediums such as, but not limited to, the Internet (not shown). Further, it should be noted there are many possible computing system configurations, of which computing system 100 is only one simple example.

Server computer 122 is coupled to a data storage 124, which like data storage 114, which may either be incorporated into server 122 i.e. an internal device, or attached externally to server 122 by means of various, commonly available connection devices such as but not limited to, a USB port (not shown). Data storage 124 is illustrated storing a networked data storage system 128, which in this example is in an NFS configuration. NFS configurations should be familiar to those with skill in the computing arts.

Also communicatively coupled to the LAN 120 is a second client computer 132, which like client computer 102, includes a data storage 134. Data storage 134 includes an EFS component 136, which may handle memory management tasks on client 132 in a fashion similar to EFS 116 on client computer 102. Although not shown in FIG. 1, it should be understood that each of server 122 and client 132 include a processor, monitor, keyboard and mouse like components 104, 106, 108 and 110, respectively.

Figure 2:
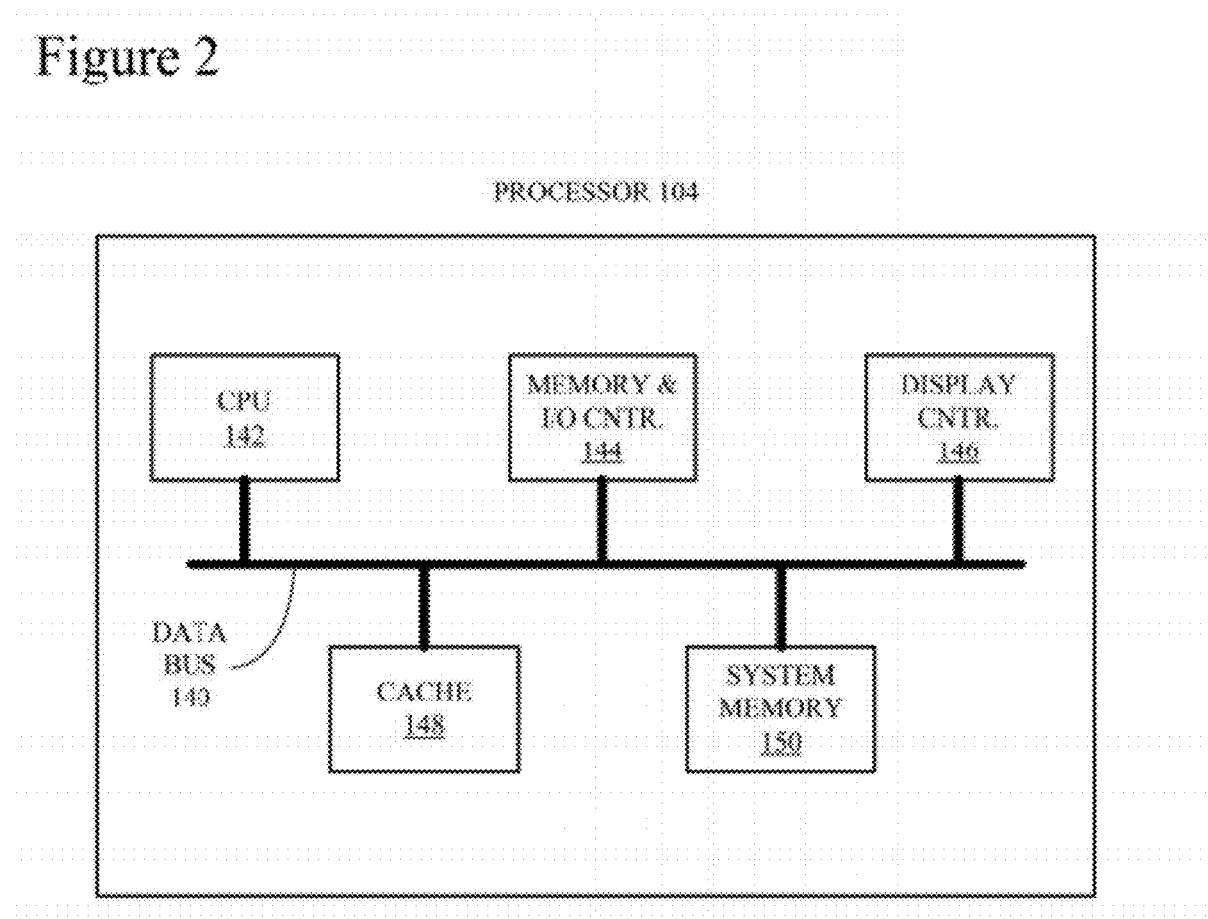
FIG. 2 is a processor of client system, both first introduced in FIG. 1, in more detail.

FIG. 2 is processor 104, first introduced in FIG. 1, in more detail. It should be understood that processor 104 is a simplified version of a typical processor showing some specific components that have particular relevance to the claimed subject matter. Processor 104 includes a data bus 140, central processing unit (CPU) 142, a memory and input/output (I/O) controller (Cntr.) 144, a display controller 146, a data cache 148 and system memory 150.

Data bus 140 provides a communication channel for components 142, 144, 146, 148, 150 to communicate both with each other and other components (not shown). CPU 142, which is controlled primarily by OS 114 (FIG. 1), executes logic associated with computing system 102 and any loaded programs and applications. Memory and I/O controller 144 controls communication over data bus 140, both between components 142, 144, 146, 148, 150 and other components that are not illustrated and with components that are external to processor 104. Display controller 146 controls monitor 106 (FIG. 1). Data cache 148 provides temporary memory for CPU 142. System memory 150 is employed by CPU 142 to primarily store memory associated with executing logic. Those with skill in the computing arts should be familiar with components 140, 142, 144, 146, 148 and 150, which are illustrated to facilitate the description of the claim subject matter in conjunction with FIGS. 3-6.

Figure 3:
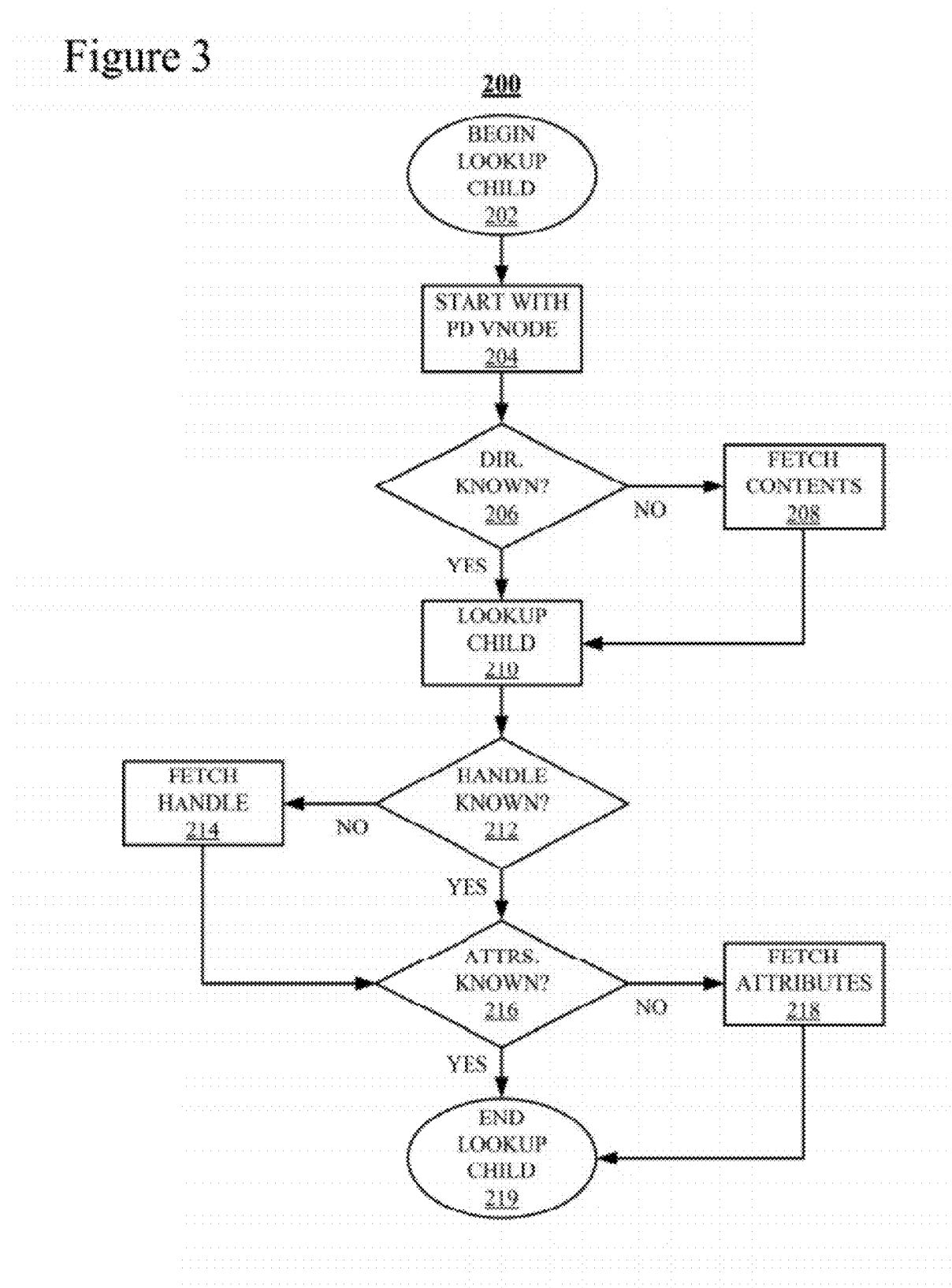
FIG. 3 is a flow chart illustrating a Lookup Child process that is one example of processing that may implement the claimed subject matter.

FIG. 3 is a flow chart illustrating a Lookup Child process 200 that is one example of processing that may implement the claimed subject matter. In this example, logic associated with process 200 is stored on data storage 112 (FIG. 1) as part of EFS 116 (FIG. 1) and executed on processor 104. In the alternative, process 200, as well as EFS 116, may be incorporated into OS 114 (FIG. 1).

Process 200 starts in a "Begin Lookup Child" block 202 and proceeds immediately to a "Start With Parent Directory (PD) Vnode" block 204. During block 204, if the appropriate file system has not already been mounted, process 200 mounts the file system, starting with the parent directory's vnode. In this example, the relevant file system is stored on data storage 124 (FIG. 1) of server 122 (FIG. 1) as part of NFS 128 (FIG. 1). When the file system is mounted, an NFS file handle for the root of the file system is provided by NFS 128 and file attributes for the root directory are fetched from NFS 128 using the provided handle. Typically, three attributes are kept for each file system object: 1) The NFS file handle; 2) the file attributes; and 3) the contents of directories within the file system object.

During a "Directory (Dir.) Known?" block 206, process 200 determines whether or not the directory contents for the parent directory of the child directory to be looked up are known. If not, process 200 proceeds to a "Fetch Contents" block 208 during which process 200 executes one or more READDIR operations to retrieve the data from the NFS server 128. During a "Lookup Child" block 210, process 200 looks up the requested child in the directory information that was either fetched during block 208 or determined to already be in memory during block 206.

During a "Handle Known?" block 212, process 200 determines whether or not the information on the child retrieved during block 210 includes the NFS file handle for the child. If not, process 200 proceeds to a "Fetch Handle" block 214 during which the relevant NFS file handle is retrieved from NFS server 128. Once the NFS file handle is know, either because it was retrieved during block 214 or determined to already be known during block 212, process 200 proceeds to an "Attributes (Attrs.) Known?" block 216. During block 216, process 200 determines whether or not the file attributes of the child file are known. If not, process 200 proceeds to a "Fetch Attributes" block 218 during which the NFS file handle retrieved during block 214 or determined to already be know during block 212 is employed to retrieve the file attributes for the child file from NFS server 128. Once the file attributes know, either because they were retrieved during block 218 or determined to already be known during block 216, process 200 proceeds to an "End Lookup Child" block 219 in which process 200 is complete.

In the alternative to blocks 214 and 218, process 200 may, in some versions of NFS 128, execute a READDIR_PLUS operation during block 208. It should be noted that the information retrieved during process 200 is stored by EFS 116 in swap space 118 (FIG. 1) and that any access to the client file is processed through the information in swap space 118 rather than via calls to NFS server 128, which is the typical procedure. In other words, a "shadow" file system is dynamically generated in swap space 118 as files and directories are accessed by client 102. Files stored in swap space 118 are also referred to a "working segments." Therefore, in accordance with the claimed subject matter, once directory contents and file attributes are fetched, the NFS server 128 does not need to be contacted with respect to the file other than to read file data. Further, there are no attempts by client 102 to detect changes to the file system on server 122.

Figure 4:
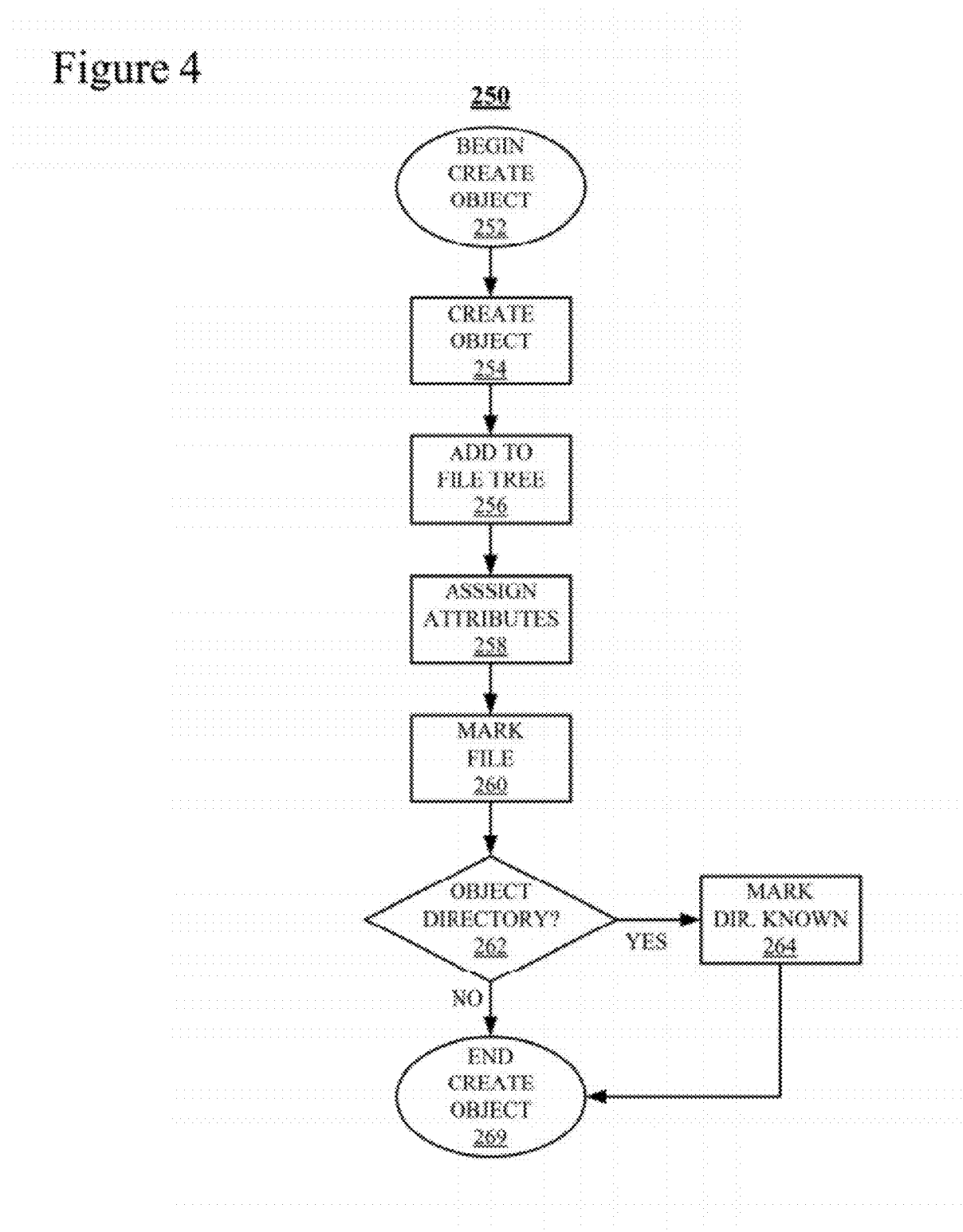
FIG. 4 is a flow chart illustrating a Create Object process that is one example of processing that may implement the claimed subject matter.

FIG. 4 is a flow chart illustrating a Create Object process 250 that is one example of processing that may implement the claimed subject matter. Like process 200 (FIG. 3), in this example, logic associated with process 250 is stored on data storage 112 (FIG. 1) as part of EFS 116 (FIG. 1) and executed on processor 104. In the alternative, process 250 may be incorporated into OS 114 (FIG. 1).

Process 250 starts in a "Begin Create Object" block 252 and proceeds immediately to a "Create Object" block 254. During block 254, a new object has been created, i.e. an object that doesn't currently exist in the current file tree. During an "Add to File Tree" block 256, the object that was created during block 254 is added to the shadow file system tree that is stored in swap space 118 (FIG. 1). During an "Assign Attributes" block 258, process 250 assigns appropriate attributes to the created file.

During a "Mark File" block 260, process 250 marks the object as having attributes and a file handle, which is typically not used. During an "Object Directory?" block 262, process 250 determines whether or not abject created during block 254 is a directory. If so, process 250 proceeds to a "Mark Directory (Dir.) Known" block 264 during which process 250 marks the object as having the directory contents known. Finally, following either block 262 or block 264 control proceeds to an "End Create Object" block 269 in which process 250 is complete.

Figure 5:
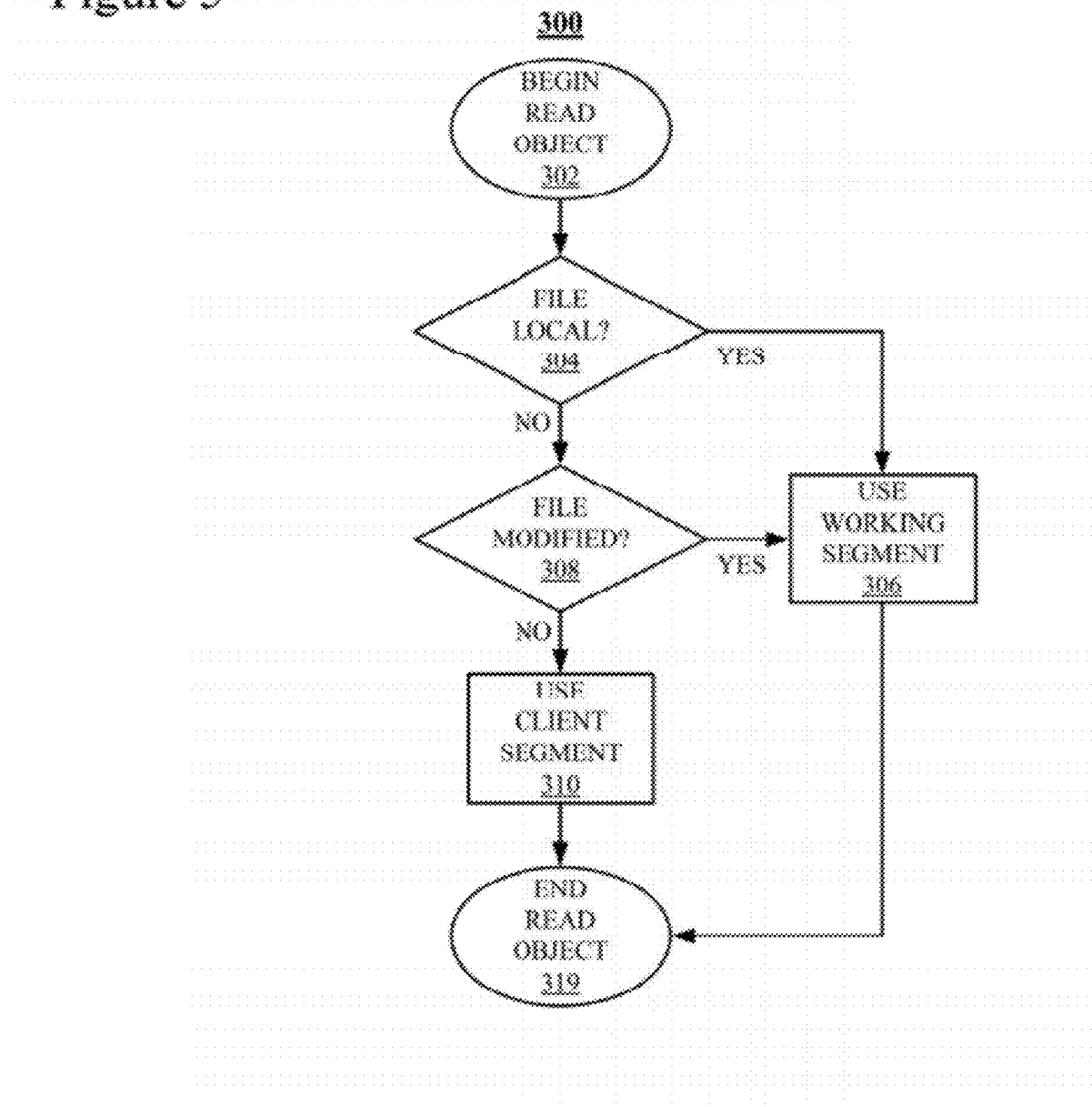
FIG. 5 is a flow chart illustrating a Read Object process that is one example of processing that may implement the claimed subject matter.

FIG. 5 is a flow chart illustrating a Read Object process 300 that is one example of processing that may implement the claimed subject matter. Like process 200 (FIG. 3) and process 250 (FIG. 4), in this example, logic associated with process 300 is stored on data storage 112 (FIG. 1) as part of EFS 116 (FIG. 1) and executed on processor 104. In the alternative, process 300, as well as EFS 116 may be incorporated into OS 114 (FIG. 1).

Process 300 starts in a "Begin Read Object" block 302 and proceeds immediately to a "File Local?" block 304. During block 304, process 300 determines whether or not, the file to be read, or the target file, has already been stored in swap space 118 (FIG. 1) by EFS 116 (FIG. 1) because the file was one that had been created (see process 250. FIG. 4) since the file tree had been mounted (see process 200, FIG. 3). If process 300 determines that the file is a created file, control proceeds to a "Use Working Segment" block 306 in which the target file, or "working segment," is read from swap space 118.

If, during block 304, process 300 determines that the target file in not a created file, control proceeds to a "File Modified?" block 308 during which process 300 determines whether or not the target file is a file that has already been accessed and modified since the file system has been mounted. In that case, the target file would already have a working segment and control would proceed to Use Working Segment block 306 and processing continues as described above.

If, during block 308, process 300 determines that the target file has not been modified, process 300 proceeds to a "Use Client Segment" block 310. During block 310, process 300 retrieves the file form the client segment serviced by NFS 128 (FIG. 1). Finally, following blocks 306 and 310, control proceeds to an "End Read Object" block 319 in which process 300 is complete.

Figure 6:
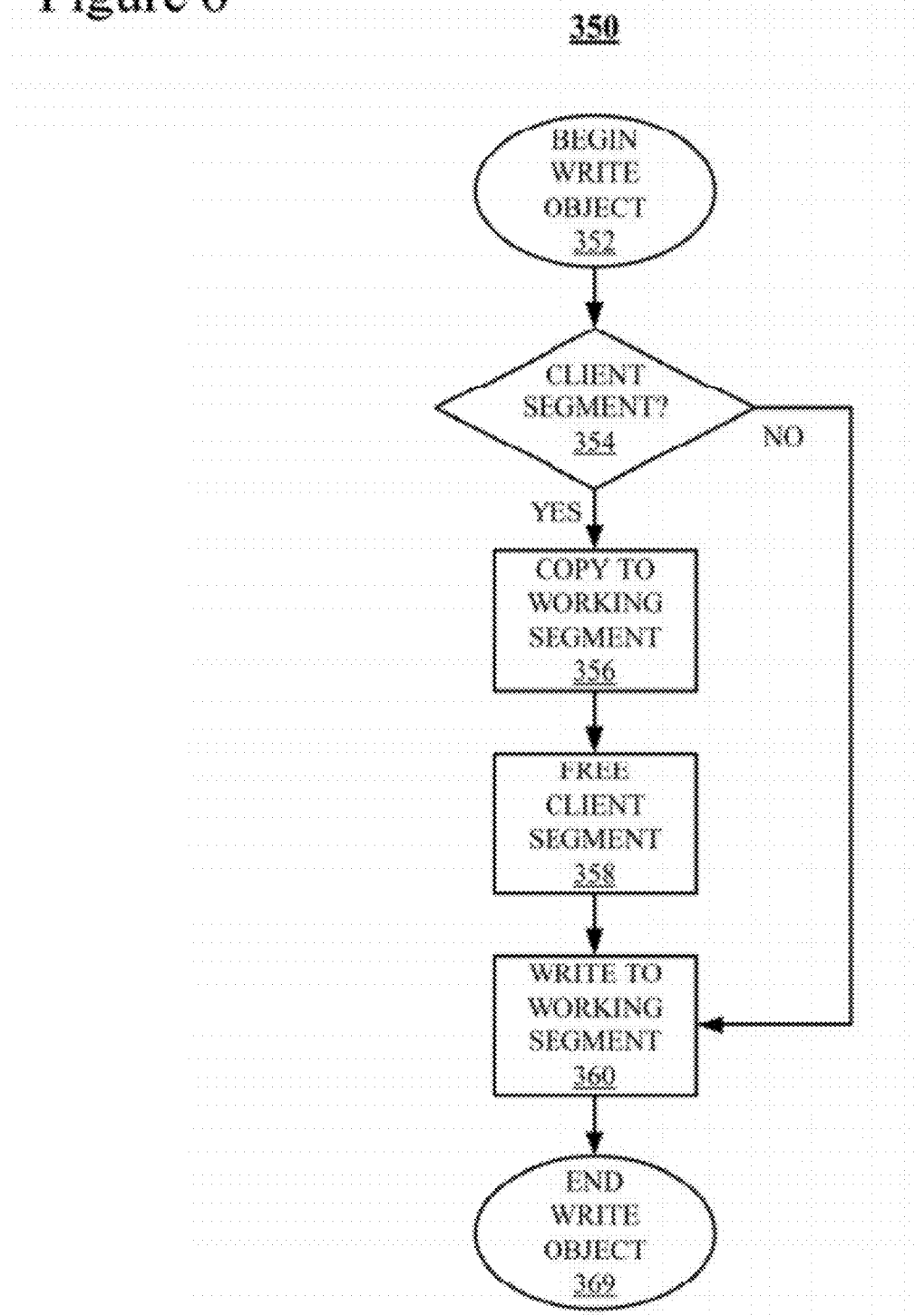
FIG. 6 is a flow chart illustrating a Write Object process that is one example of processing that may implement the claimed subject matter.

FIG. 6 is a flow chart illustrating a Write Object process 350 that is one example of processing that may implement the claimed subject matter. Like process 200 (FIG. 3), process 250 (FIG. 4) and process 300 (FIG. 5), in this example, logic associated with process 350 is stored on data storage 112 (FIG. 1) as part of EFS 116 (FIG. 1) and executed on processor 104. In the alternative, process 200, as well as EFS 116 may be incorporated into OS 114 (FIG. 1).

Process 350 starts in a "Begin Write Object" block 352 and proceeds immediately to a "Client Segment?" block 354. During block 354, process 350 determines whether or not the object being written, or "target" object, is stored in the client section serviced by NFS 128 (FIG. 1) or has a corresponding file, or a working segment, in swap space 118. If the target object does not have corresponding working segment, then process 350 proceeds to a "Copy to Working Segment" block 356 during which the target object is copied to swap space 118. During a "Free Client Segment" block 358, process 350 frees the client segment and from that point forward the target object is accessed through EFS 116 and the working segment in swap space 118. During a "Write to Working Segment" block 360, the target object is updated by writing to the working segment. Finally, control proceeds to an "End Write Object" block 369 in which processing is complete.

The intention of the claimed subject matter is to reduce traffic between client 102 and server 122 by limited contact to a single interaction for each file accessed. Changes to files are not moved to server 122 and, therefore, each time client 102 mounts a particular file system from server 122, the mounted file system is in an original state. In addition, changes to a file system executed by a client such as 102 are not seen by other clients such as client 132 (FIG. 1). In situations in which a change to a file system is not needed after a system restart, EPS 116 provides an alternative to NFS 128 that uses less resources on client 102 and provides server 122 to maintain only a single copy of a particular file system that can be used by all clients.

While the claimed subject matter has been shown and described with reference to particular embodiments thereof, it will be understood by those skilled in the art that the foregoing and other changes in form and detail may be made therein without departing from the spirit and scope of the claimed subject matter, including but not limited to additional, less or modified elements and/or additional, less or modified blocks performed in the same or a different order.

We claim:

1. A method for the management of memory in a computing system, comprising:
   mounting a remote file system on a computing system;
   receiving an instruction to read a file of the remote file system;
   determining whether or not the file was created after the mounting;
   if determined that the file was created after the mounting, reading the file from a memory local to the computing system; and
   otherwise:
      determining whether or not the file has been modified after the file was mounted; and
      if determined that the file has been modified, reading the file from the memory; and
      otherwise, reading the file from the remote file system.

2. The method of claim 1, further comprising:
   receiving, an instruction to write to the file;
   if determined that a copy is stored in the memory on the computing system, writing to the copy stored in the memory; and
   otherwise:
      writing a copy of the file to the memory;
      writing to the copy;
      and freeing a link to the remote file system corresponding to the file.

3. The method of claim 2, further comprising directing subsequent operations on the file to the copy of the file stored in memory.

4. The method of claim 1, further comprising:
   creating an object for addition in a file tree corresponding to the mounted remote file system;
   creating a node in the file tree corresponding to the object;
   assigning attributes to the object;
   determining whether or not the object is a directory;
   if the object is determined to be a directory, marking the object as a know directory; and
   if the object is determined not to be a directory, marking the object as a file.

5. The method of claim 1, wherein the remote file system is a Network File System (NFS).

6. The method of claim 1, wherein, when written to memory, the file is written to the swap space of the computing system.

7. The method of claim 6, wherein the remote file system is employed as a backup store for cached data associated with the remote file system.

8. A computing system with efficient memory management, comprising:
   a processor;
   a memory coupled to the processor;
   logic, stored on the memory and executed on the processor, for:
      mounting a remote file system on a computing system;
      receiving an instruction to read a file of the remote file system:
      determining whether or not the file was created after the mounting;
      if determined that the file was created after the mounting, reading the file from a memory local to the computing system; and
      otherwise:
         determining whether or not the file has been modified after the file was mounted; and
         if determined that the file has been modified, reading the file from the memory; and otherwise, reading the file from the remote file system.

9. The system of claim 8, the logic further comprising logic for:
receiving an instruction to write to the file;
if determined that a copy is stored in the memory on the computing system, writing to the copy stored in the memory; and
otherwise;
writing a copy of the file to the memory;
writing to the copy;
and freeing a link to the remote file system corresponding to the file.

10. The system of claim 9, further comprising logic, stored on the memory and executed on the processor, for directing subsequent operations on the file to the copy of the file stored in memory.

11. The system of claim 8, further comprising logic, stored on the memory and executed on the processor for:
creating an object for addition in a file tree corresponding to the mounted remote file system;
creating a node in the file tree corresponding to the object;
assigning attributes to the object;
determining whether or not the object is a directory;
if the object is determined to be a directory, marking the object as a know directory; and
if the object is determined not to be a directory, marking the object as a file.

12. The system of claim 8, wherein the remote file system is a Network File System (NFS).

13. The system of claim 8, wherein, when written to memory, the file is written to the swap space of the computing system.

14. The system, of claim 13, wherein the remote file system is employed as a backup store for cached data associated with the remote file system.

15. A computer programming product, comprising:
a computer readable storage medium;
logic, stored on the computer readable storage medium for execution on a processor, for:
mounting a remote file system on a computing system;
receiving an instruction to read a file of the remote file system;
determining whether or not the file was created after the mounting;
if determined that the file was created after the mounting, reading the file from a memory local to the computing system; and
otherwise:
determining whether or not the file has been modified after the file was mounted; and
if determined that the file has been modified, reading the file from the memory; and
otherwise, reading the file from the remote file system.

16. The computer programming product, of claim 15, the logic further comprising logic for:
receiving an instruction to write to the file;
if determined that a copy is stored in the memory on the computing system, writing to the copy stored in the memory; and
otherwise:
writing a copy of the file to the memory;
writing to the copy:
and freeing a link to the remote file system corresponding to the file.

17. The computer programming product, of claim 16, further comprising logic, stored on the memory and executed on the processor, for directing subsequent operations on the file to the copy of the file stored in memory.

18. The computer programming product, of claim 15, further comprising logic, stored on the memory and executed on the processor for:
creating an object for addition in a file tree corresponding to the mounted remote file system;
creating a node in the file tree corresponding to the object;
assigning attributes to the object;
determining whether or not the object is a directory;
if the object is determined to be a directory, marking the object as a know directory; and
if the object is determined not to be a directory, marking the object as a file.

19. The computer programming product of claim 15, wherein, when written to memory, the file is written to the swap space of the computing system.

20. The computer programming product, of claim 19, wherein the remote file system is employed as a backup store for cached data associated with the remote file system.

* * * * *